C. C. FERRY.
TIRE.
APPLICATION FILED JUNE 16, 1914.

1,131,500.

Patented Mar. 9, 1915.

Inventor
C. C. Ferry,
By Victor J. Evans
Attorney

Witnesses

UNITED STATES PATENT OFFICE.

CLIVE C. FERRY, OF MIDDLEBURY CENTER, PENNSYLVANIA.

TIRE.

1,131,500.

Specification of Letters Patent. Patented Mar. 9, 1915.

Application filed June 16, 1914. Serial No. 845,454.

*To all whom it may concern:*

Be it known that I, CLIVE C. FERRY, a citizen of the United States, residing at Middlebury Center, in the county of Tioga and State of Pennsylvania, have invented new and useful Improvements in Tires, of which the following is a specification.

This invention relates to pneumatic tires, the object in view being to produce a practical, puncture-proof outer case or shoe for pneumatic tires involving the use of a plurality of layers of puncture-proof metal plates of novel formation and relation to each other, the several series of plates forming a practically non-puncturable armor incorporated in the fabric of the tire and the individual plates being of such peculiar formation that while they overlap or break joint with each other, they also provide means for preventing the rotation or shifting thereof within the fabric of the tire after the vulcanizing process has been completed.

With the above and other objects in view, the invention consists in the novel construction, combination and arrangement of parts, as herein described, illustrated and claimed.

Figure 1:
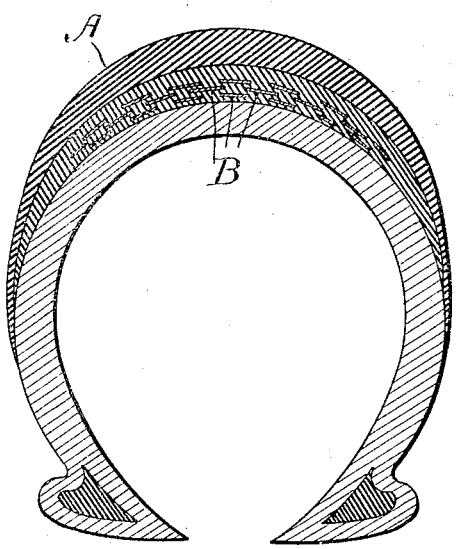
Figure 2:
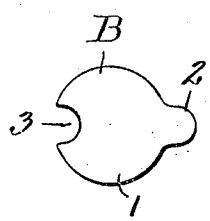
Figure 3:
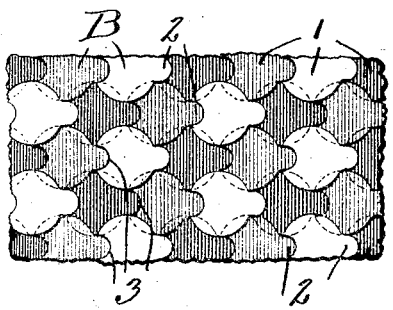

In the accompanying drawings: Figure 1 is a cross section through the outer shoe or case of a pneumatic tire constructed in accordance with the present invention. Fig. 2 is a detail plan view of one of the plates. Fig. 3 is a transparent perspective view of a section of the tire showing the relative arrangement of the plates.

Referring to the drawings A generally designates the outer shoe or case of a pneumatic tire such as is now in common use. Many attempts have been made to render such an outer case or shoe puncture-proof by inserting therein small metal disks arranged in overlapping or break joint relation to each other and in several superimposed layers separated from each other by a portion of the rubber or fabric of the tire. In order to keep down the weight of the tire as far as possible, these disks have necessarily been made quite thin, in fact so thin that the circular edges thereof have formed cutting edges which in a short time cause said disks to cut through the fabric due to the continual bending or kneading action of the tire. After such a tire has been in use for some time, an apparent blister will appear in the tread or side wall of the tire and when the same is opened up, hundreds of these small disks pour out therefrom, showing that the disks have cut their way through the tire fabric and accumulated, leaving portions of the tire unprotected by said disks and therefore subject to puncture by nails, tacks and other sharp objects.

In carrying out the present invention, I make each of the puncture-proof plates as shown in Fig. 2, B designating generally one of said plates. The main body 1 of the plate shown resembles a disk but departs therefrom in that it is provided with a tongue 2 projecting from one edge thereof, and a recess 3 formed in the opposite edge thereof and corresponding in shape to the projection 2, as if the projection 2 had been cut from the body 1 to form the recess 3. Two or more layers or series of such plates B are incorporated in the fabric of the tire as illustrated in Fig. 1, the layers being superimposed one upon the other and the plates of each layer being arranged in overlapping or break joint relation to each other so that the projection 2 of one plate will be in radial alinement with and cover the recess 3 of another plate. The layers are so arranged relatively to each other that the plates thereof will bear an overlapping or break joint relation and thus it is practically impossible for a nail or like object to pass entirely through the outer case as it is certain to be deflected by one or more plates B.

The plates under the arrangement hereinabove described may either be incorporated in the fabric of the tire itself or they may be incorporated in a strip of rubber and textile fabric, which strip may be incorporated in the main body or carcass of the tire during the vulcanizing process.

It will be understood that the projections 2 and recesses 3 not only serve to elongate the outer marginal edge of each plate but they serve as keys or bonds when the rubber and fabric is vulcanized around the same, the said projection and recess serving to prevent the plate from starting to revolve so as to cut its way into and through the tire fabric. It will also be understood that during the vulcanizing process, the rubber is expanded so as to enter the recess 3 and fully occupy the same, the rubber on both sides of each plate B flowing together and combining under the vulcanizing process. In the same way and for the same reason the projections 2 are enveloped in the rubber and fabric.

What I claim is:—

1. A pneumatic tire having incorporated therein a plurality of layers of puncture-proof plates so arranged relatively to each other that the plates of one layer break joint with the plates of the next layer, each plate being provided with a projecting tongue at one edge and a recess of corresponding shape opposite said tongue, the plates of one layer being so disposed with relation to the plates of the adjoining layer that a tongue of one plate lies in radial alinement with and covers the recess of another plate.

2. A pneumatic tire having incorporated in the fabric thereof a plurality of layers of puncture-proof plates so arranged relatively to each other that the plates of one layer break joint with the plates of the next layer, each plate being provided with a projecting tongue at one edge and a recess of corresponding shape opposite said tongue, the plates of one layer being so disposed with relation to the plates of the adjoining layer that a tongue of one plate lies in radial alinement with and covers the recess of another plate, the plies of the fabric being vulcanized together around and between the plates of each layer and through the said recesses in the plates.

In testimony whereof I affix my signature in presence of two witnesses.

CLIVE C. FERRY.

Witnesses:
JAMES A. KOEHL,
E. EDMONSTON, Jr.

Copies of this patent may be obtained for five cents each, by addressing the "Commissioner of Patents, Washington, D. C."